US012650187B2

(12) United States Patent
    Pan

(10) Patent No.: US 12,650,187 B2
(45) Date of Patent: Jun. 9, 2026

(54) ROTATABLE WATER PIPE JOINT AND ASSEMBLY METHOD THEREOF

(71) Applicant: Ningbo Gaohe Baichuang Intelligent Technology Co., LTD., Ningbo (CN)

(72) Inventor: Jingwen Pan, Zhejiang (CN)

(73) Assignee: Ningbo Gaohe Baichuang Intelligent Technology Co., LTD., Ningbo (CN)

( * ) Notice: Subject to any disclaimer, the term of this patent is extended or adjusted under 35 U.S.C. 154(b) by 0 days.

(21) Appl. No.: 19/192,528

(22) Filed: Apr. 29, 2025

(65) Prior Publication Data

US 2025/0334216 A1      Oct. 30, 2025

(30) Foreign Application Priority Data

Apr. 30, 2024     (CN) .......................... 202410539593.2

(51) Int. Cl.
    *F16L 27/08*          (2006.01)
(52) U.S. Cl.
    CPC ................................ *F16L 27/0804* (2013.01)

(58) Field of Classification Search
    CPC . F16L 37/22; F16L 37/23; F16L 37/53; F16L
              27/0804; F16L 27/0808; F16L 27/0832;
                    F16L 27/0824; F16L 27/0828
    See application file for complete search history.

(56) References Cited

U.S. PATENT DOCUMENTS

| | | | | |
|---|---|---|---|---|
| 3,504,935 A | * | 4/1970 | Gullihur | F16L 27/0832 |
| | | | | 285/94 |
| 3,799,589 A | * | 3/1974 | Boelkins | F16L 27/0832 |
| | | | | 285/321 |
| 6,409,227 B1 | * | 6/2002 | Lu | F16L 27/0824 |
| | | | | 285/276 |
| 2015/0219259 A1 | | 8/2015 | Weems et al. | |

* cited by examiner

*Primary Examiner* — Aaron M Dunwoody

(57)          ABSTRACT

The invention provides a rotatable water pipe joint and assembly method thereof, wherein the rotatable water pipe joint comprises an outer adapter having a cylindrical shaft rotating cavity; an inner adapter pivotably disposed within the shaft rotating cavity of the outer adapter; and a rolling assembly arranged between the outer adapter and the inner adapter, the rolling assembly is sleeved on the outer side of the inner adapter and is positioned on the inner side of the outer adapter, and the rolling assembly reduces friction between the outer adapter and the inner adapter in a rolling manner.

12 Claims, 9 Drawing Sheets

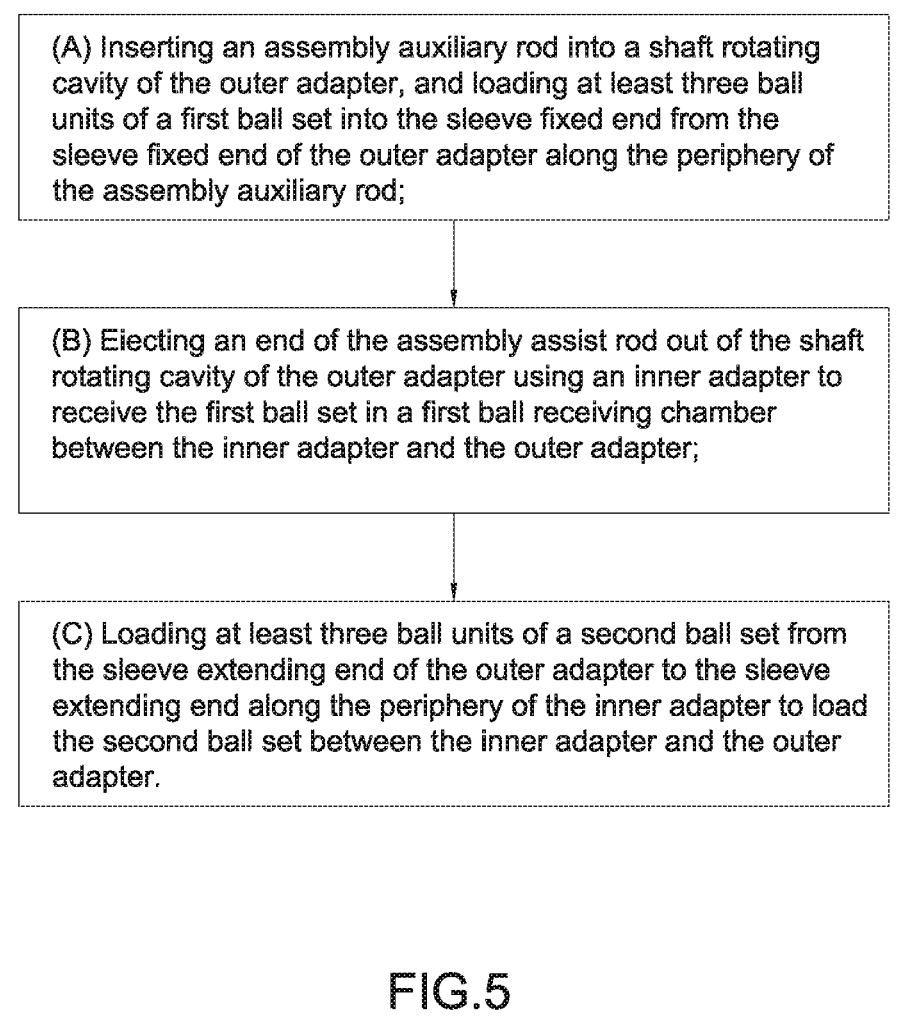

(A) Inserting an assembly auxiliary rod into a shaft rotating cavity of the outer adapter, and loading at least three ball units of a first ball set into the sleeve fixed end from the sleeve fixed end of the outer adapter along the periphery of the assembly auxiliary rod;

(B) Ejecting an end of the assembly assist rod out of the shaft rotating cavity of the outer adapter using an inner adapter to receive the first ball set in a first ball receiving chamber between the inner adapter and the outer adapter;

(C) Loading at least three ball units of a second ball set from the sleeve extending end of the outer adapter to the sleeve extending end along the periphery of the inner adapter to load the second ball set between the inner adapter and the outer adapter.

FIG.5

ROTATABLE WATER PIPE JOINT AND ASSEMBLY METHOD THEREOF

CROSS REFERENCE TO RELATED APPLICATIONS

This application is based on a Chinese patent application with application number 202410539593.2, filed on Apr. 30, 2024, and claims priority to the Chinese patent application. The entire content of the Chinese patent application is hereby incorporated by reference.

BACKGROUND OF THE PRESENT INVENTION

Field of Invention

The invention relates to the technical field of gardens, in particular to a rotatable water pipe joint and assembly method thereof.

Description of Related Arts

Water pipe joints are common and commonly used in daily life, which are mainly used in the connection of various water pipes, such as bathroom showers, garden and industrial water pipe nozzles, or for the extension of docking between two water pipes. The water pipe and the spray head are butted through the water pipe joint, and the sealing and water leakage resistance of the connection are realized by the water pipe joint. In the prior art, the butt joints or adapters of water pipes usually use more than one accessory to connect their water pipes, so the accessories on the water pipes must be repeatedly installed and removed. Fittings for water pipes include nozzles, spray guns, sprinklers, pressure washers, extension tubes, rods, and a variety of other equipment.

The water pipe joint not only needs to realize sealing connection, but also needs to prevent some problems that may be encountered in the use process, for example, the soft water pipe can be bent and rotated in the use process, or the nozzle or the spray gun connected with the other end of the water pipe joint can be continuously switched in the use process, so that the water pipe joint not only needs to keep good connection performance, It is also necessary to maintain a relatively good sealing relationship between the adjusting water pipe and the nozzle or spray gun connected at the other end during rotation.

Although the water pipe joint in the prior art, which is used as a key joint component for connecting a water pipe with a nozzle or a spray gun and the like, can keep being communicated and sealed, when the two ends of the water pipe joint rotate relatively, such as rotating the water pipe or rotating the nozzle or the spray gun, the water pipe joint is difficult to keep the two rotating relatively or synchronously. In this way, the water pipe or this end will be entangled in the use process, which will affect the user's experience.

In the prior art, coiling to store a long hose by pulling the hose or spray head often puts pressure on the user holding the spray head or nozzle because the hose needs to be uncoiled as it is pulled. If the user does not stop pulling and rotating the hose and spray head to deploy the hose, this action can cause the hose to wobble and often kink. This requires the user to constantly rotate the hose or sprinkler in order to uncoil the coiled hose or to coil the hose. Accordingly, there is a need for a device that allows for easier winding and unwinding of a stored water line and for easier installation from the water line.

In the prior art, the water pipe connector is generally separated from the faucet/fitting connecting part and the water pipe connecting part, and is sealed by an O-ring. In the prior art, the water pipe joint can flexibly rotate under the condition of no water supply in the use process, but once water is supplied and the water pressure is increased, the two movable parts are clamped, and the friction is increased, so that the flexible rotation can not be continued.

Also disclosed in U.S. patent application Ser. No. 14/614, 486 is a free-spinning hose connection comprising a free-spinning nipple on the end of a hose, a rigid sleeve surrounding a portion of the hose, wherein the rigid outer sleeve is free to rotate with a coupling around the end of the hose that it surrounds. The coupling includes a first portion and a second portion, wherein the first portion includes a circular male threaded end for attachment to an accessory or other hose, wherein the male threaded end is connected to a larger diameter first base. The first and second portions of the coupling are connected by a free-rotating connection that allows each portion of the coupling to rotate freely relative to each other about a longitudinal axis therethrough. The freely rotating connection is established by a track integral with the first or second coupling part. The track receives one or more ball bearings that are inserted through the entrance of the first coupling portion. The access port is then sealed using a pin, screw, or other means to seal the access port.

Although the hose connecting device disclosed by the application overcomes the winding problem of the water pipe and the joint due to rotation, the hose connecting device still has the following defects in at least one aspect: firstly, the ball is installed on two connecting parts through a small hole, and the ball needs to be manually installed inside through the small hole one by one, so the installation process is difficult and the efficiency is very low; Secondly, because the ball is installed between the two connecting parts from the outside, once the ball enters, it is difficult to take it out, and the connecting device can not be disassembled and repaired, so its service life is very limited. 3, that ball are installed on two relatively rotatable part along the direction perpendicular to the axial direction of the joint, and when the two relatively rotatable parts of the joint move relatively along the axial direction, the balls are easily damaged due to the interference of the two relative rotation; However, when the water pipe is connected, the coupling of the hose connection device will move back and forth under the action of the water pressure at the end, and this short distance movement will cause the pressure change of the outer sleeve and the coupling, thereby affecting the service life.

SUMMARY OF THE PRESENT INVENTION

It is a primary advantage of the present invention to provide a rotatable water pipe joint and assembly method thereof, wherein the rotatable water connector interfaces a water hose with a spray head, nozzle, or other device, allowing the hose and spray head, etc., attached to opposite ends of the swivel connector to rotate relative to each other, preventing snagging.

Another advantage of the present invention is to provide a rotatable water pipe joint and assembly method thereof, wherein the rotatable water pipe joint comprises an inner adapter, an outer adapter, and a rolling assembly disposed between the inner adapter and the outer adapter, wherein the rolling assembly is disposed between the inner adapter and the outer adapter in an axial direction, facilitating the relative rotation of the inner adapter and the outer adapter.

Another advantage of the present invention is to provide a rotatable water pipe joint and assembly method thereof, wherein the rolling assembly includes an inner ball set and/or an outer ball set, wherein the inner ball set and the outer ball set are arranged in parallel along an axial direction, and when the inner adapter and the outer adapter are relatively displaced, the inner ball set and the outer ball set can provide a supporting effect along the axial direction and are not easy to damage.

Another advantage of the present invention is to provide a rotatable water pipe joint and an assembly method thereof, wherein the assembly method of the inner ball set and/or the outer ball set is simple and reliable, which is beneficial to improving the assembly efficiency and the product yield.

Another advantage of the present invention is to provide a rotatable water pipe joint and a method of assembling the same in which the inner ball set and the outer ball set can be assembled from both sides of the outer adapter with high efficiency and stability.

According to one aspect of the present invention, a rotatable water pipe joint of the present invention, which achieves the foregoing objects and other objects and advantages, comprising:

An outer adapter having a cylindrical shaft rotating cavity;

An inner adapter pivotably disposed within the shaft rotating cavity of the outer adapter; and A rolling assembly arranged between the outer adapter and the inner adapter, the rolling assembly is sleeved on the outer side of the inner adapter and is positioned on the inner side of the outer adapter, and the rolling assembly reduces friction between the outer adapter and the inner adapter in a rolling manner.

According to one embodiment of the invention, the outer adapter comprises an outer sleeve, a sleeve fixing end and a sleeve extending end, wherein the sleeve fixing end integrally extends outwards along the axial direction from one end of the outer sleeve, the sleeve extending end integrally extends outwards along the axial direction from the other end of the outer sleeve, the outer sleeve of the outer adapter is sleeved on the outer side of the inner adapter, a fixed accommodating cavity is formed at the outer side of the outer sleeve by the fixed end of the sleeve, and an extended accommodating cavity is formed at the outer side of the outer sleeve by the sleeve extending end of the sleeve.

According to one embodiment of the present invention, the rolling assembly is located outside the end of the outer sleeve of the outer adapter, and the rolling assembly is disposed in the fixed accommodating cavity and/or the extended accommodating cavity.

According to one embodiment of the invention, the inner adapter comprises an inner shaft barrel, a connecting end and a boss, wherein the connecting end integrally extends outwards from one end of the inner shaft barrel along the axial direction of the inner shaft barrel, and the boss integrally extends outwards from the other end of the inner shaft barrel along the axial direction of the inner shaft barrel, and the inner shaft barrel is sleeved on the inner side of the outer sleeve of the outer adapter.

According to one embodiment of the present invention, the boss of the inner adapter is located in the fixed accommodating receiving cavity of the sleeve fixing end of the outer adapter, and the end opening of the sleeve fixing end is in the same direction as the end opening of the boss; the connection end of the inner adapter protrudes from the extension end of the sleeve of the outer adapter to the outer side of the extension accommodating cavity.

According to one embodiment of the present invention, further comprising a limiting ring, wherein the limiting ring is disposed at one end of the inner shaft barrel of the inner adapter and inside the sleeve extending end of the sleeve of the outer adapter, for limiting the displacement of the inner adapter along the direction of the rotation axis O.

According to one embodiment of the present invention, the rolling assembly comprises a first ball set, wherein the first ball set is located in the fixing accommodation cavity of the outer adapter, which is disposed between the boss of the inner adapter and one end of the outer sleeve of the outer adapter in the direction of the rotation axis O; disposed between an outer diameter surface of the inner shaft barrel of the inner adapter and an inner diameter surface of the outer sleeve of the outer adapter in a direction perpendicular to the axis of rotation O.

According to one embodiment of the present invention, the rolling assembly includes a second ball set, wherein the second ball set is located in the extended housing cavity of the outer adapter, which is disposed between the limiting ring 40 and the other end of the outer sleeve of the outer adapter in the direction along the axis of rotation O; disposed between an outer diameter surface of the inner shaft barrel of the inner adapter and an inner diameter surface of the outer sleeve of the outer adapter in a direction perpendicular to the axis of rotation O.

According to one embodiment of the present invention, the inner shaft barrel comprises a shaft tube main body, and a first protruding end and a second protruding end that integrally extend outward from the shaft tube main body, wherein the first protruding end protrudes from the shaft tube main body to the fixed accommodating receiving cavity of the sleeve fixing end, and the second protruding end protrudes from the shaft tube main body to the extending accommodating cavity of the extending fixing end.

According to one embodiment of the invention, the outer diameter of the inner shaft barrel is smaller than inner diameter of the fixed end of the sleeve, the outer diameter of the inner shaft barrel is smaller than inner diameter of the sleeve extending end of the sleeve, and a first ball accommodating chamber for accommodating the first ball set is formed at the first protruding end of the inner shaft barrel, the boss, the end of the outer sleeve and the sleeve fixing end; a second ball accommodating chamber for accommodating the second set of balls is formed at the second protruding end of the inner shaft barrel, the stopper ring, the other end of the outer sleeve, and the sleeve extending end.

According to an embodiment of the present invention, the first ball set comprises a plurality of ball units, and the second ball set comprises a plurality of ball units, wherein the size of the ball units of the first ball set and the second ball set can be adjusted according to the size of the accommodating chamber.

According to one embodiment of the invention, further having at least one adjustable gap, wherein the adjustable gap is formed between the boss of the inner adapter and the outer sleeve of the outer adapter and/or between the spacing ring and the outer sleeve of the outer adapter.

According to one embodiment of the present invention, further comprising a gasket, wherein the gasket is sleeved between the sleeve extending end of the sleeve of the outer adapter and the inner shaft barrel, and is located outside the second ball set.

According to one embodiment of the present invention, further comprising a sealing member, wherein the sealing member is disposed between the inner adapter and the outer adapter.

According to another aspect of the present application, there is further provided a method of assembling a rotatable water pipe joint, wherein the method of assembling comprises the steps of:

(A) Inserting an assembly auxiliary rod into a shaft rotating cavity of the outer adapter, and loading at least three ball units of a first ball set into the sleeve fixed end from the sleeve fixed end of the outer adapter along the periphery of the assembly auxiliary rod;

(B) Ejecting an end of the assembly assist rod out of the shaft rotating cavity of the outer adapter using an inner adapter to receive the first ball set in a first ball receiving chamber between the inner adapter and the outer adapter; and (C) Loading at least three ball units of a second ball set from the sleeve extending end of the outer adapter to the sleeve extending end along the periphery of the inner adapter to load the second ball set between the inner adapter and the outer adapter.

According to one embodiment of the invention, the assembly aid lever is embodied as an inner adapter that is inserted in an inverted manner from the extended receiving cavity into the fixed accommodating receiving cavity, facilitating the installation of the ball unit from the outside of the inner adapter into the fixed end of the sleeve.

According to one embodiment of the present invention, in step (B) of the assembly method, the inner adapter is inserted from the sleeve fixing end of the outer adapter through the outer sleeve to the sleeve extending end until the boss of the inner adapter is inserted into the sleeve fixing end.

According to one embodiment of the present invention, between the steps (B) and (C), there is included the step of flipping the inner adapter and the outer adapter so that the opening of the sleeve extending end of the sleeve of the outer adapter faces upward.

According to an embodiment of the present invention, the assembling method further comprises the step of installing a gasket and a stop ring above the second ball set.

Further objects and advantages of the invention will become more fully apparent from an understanding of the following description and accompanying drawings.

These and other objects, features, and advantages of the present invention will become more fully apparent from the following detailed description and accompanying drawings.

BRIEF DESCRIPTION OF THE DRAWINGS

The technical solution of the present invention will be further described in detail below with reference to the accompanying drawings and embodiments. In the drawings, like reference numerals are used to refer to like parts unless otherwise specified.

FIG. 5 is a step diagram of a method of assembling a rotatable water pipe joint according to another preferred embodiment of the present invention.

DETAILED DESCRIPTION OF THE PREFERRED EMBODIMENT

Figure 1:
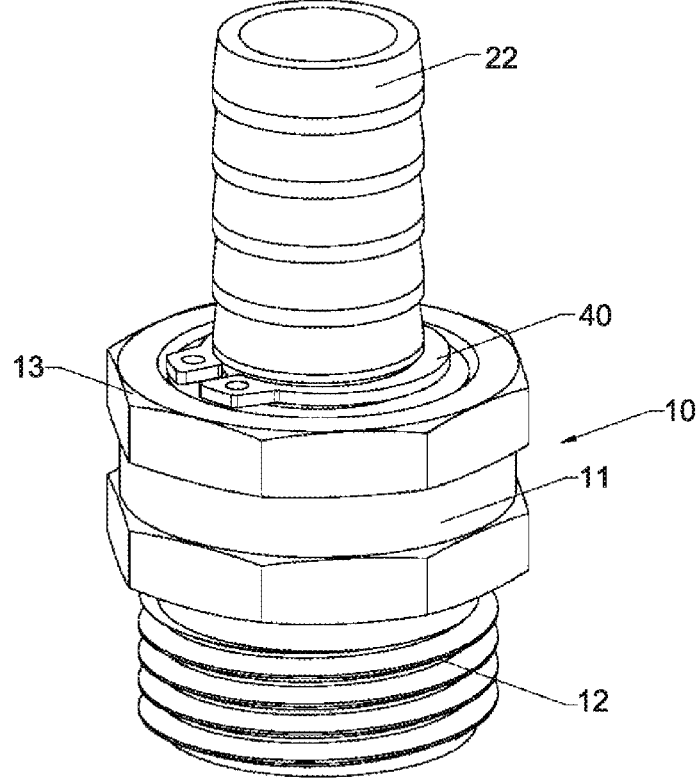
FIG. 1 is a schematic diagram of the overall structure of a rotatable water pipe joint according to the first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The skilled technicians in the art should understand that, in the disclosure of this present invention the technical terms, "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, this is only for the convenience and simplifying the description for the present invention, it does not indicate or imply that the pointed device or element must have a specific orientation, be constructed and operated in a specific orientation, so the above terms should not be understood as a limitation of the present invention.

It can be explained that the term "a" should understood as "at least one" or "one or more", that is, in one embodiment, the number of an element can be one, and in another embodiment, the number of the element can be multiple, and the term "one" cannot be understood as a limitation on the number.

A rotatable water pipe joint according to a first prefer embodiment of that present application is illustrated in the following description with reference to FIGS. 1 to 4B of the accompany drawings of the specification of the present application. The rotatable water pipe joint is used for conductively connecting a water pipe with a spray head, a spray nozzle or other equipment and allowing the equipment at the two ends of the rotatable water pipe joint to relatively rotate without being easily wound, namely, the water pipe is rotated under the condition of keeping the spray head, the spray nozzle or other equipment still; or rotate the spray head nozzle or other device while the hose remains stationary, and the devices at both ends of the rotatable hose connector do not become kinked or entangled due to relative rotation.

Figure 2:
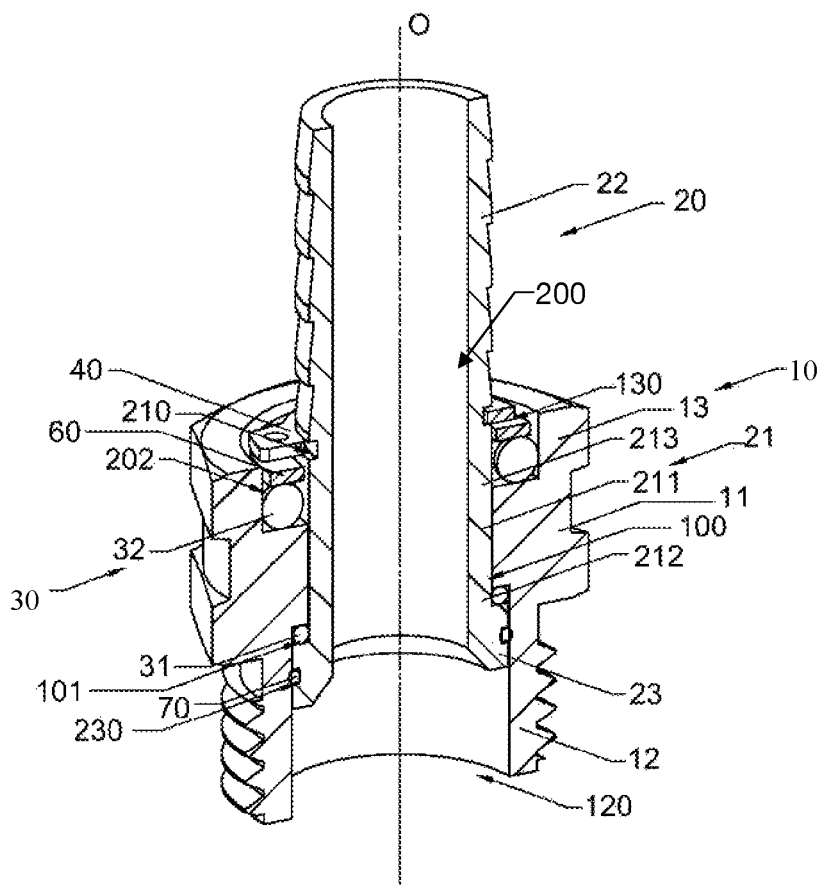
FIG. 2 is a sectional view of the rotatable water pipe joint according to the first preferred embodiment of the present invention.
Figure 3:
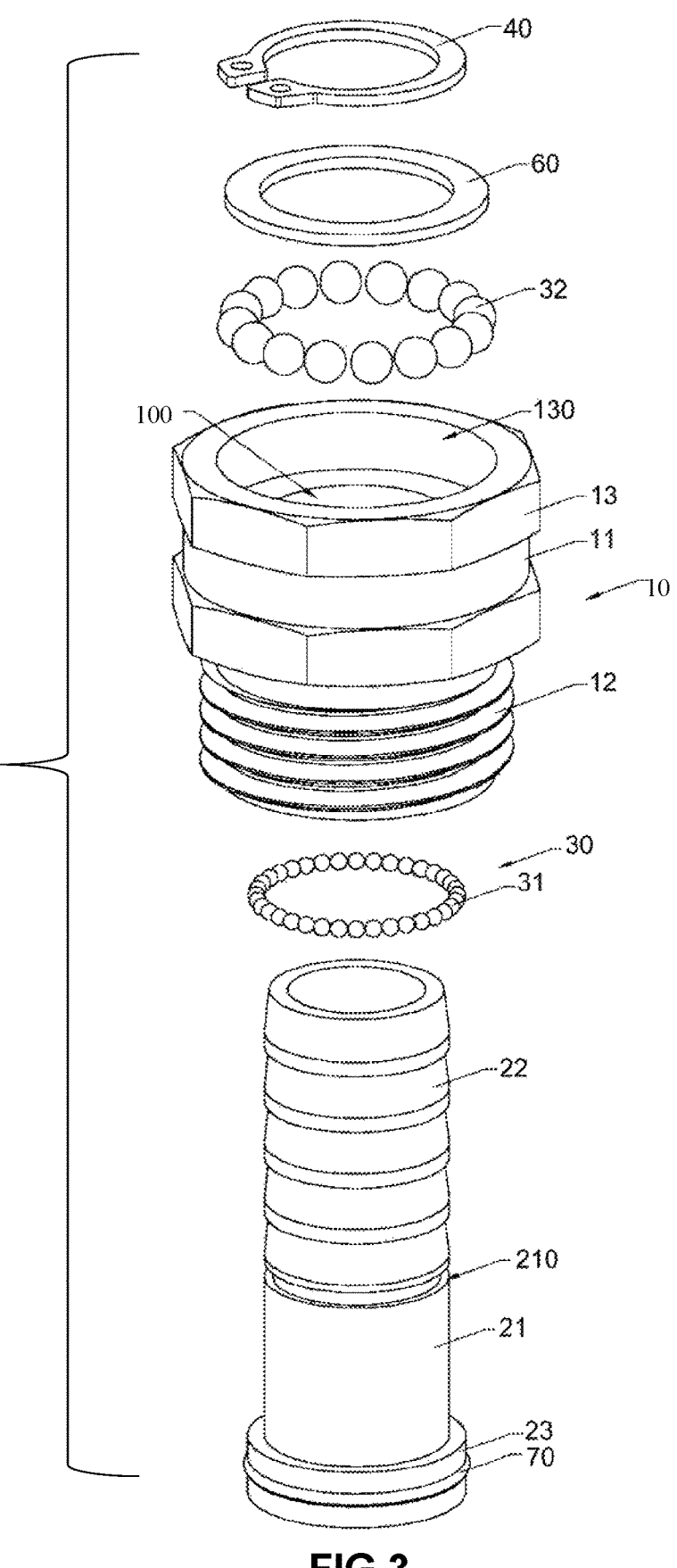
FIG. 3 is an exploded view of the rotatable water pipe joint according to the first preferred embodiment of the present invention.
Figure 4A:
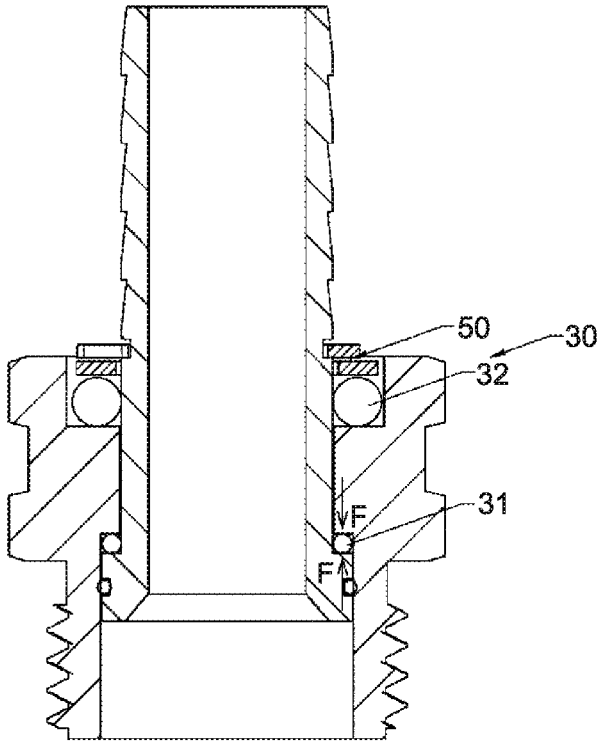
FIGS. 4A and 4B are sectional views of the rotatable water pipe joint according to the first preferred embodiment of the present invention when subjected to a force in the axial direction.
Figure 4B:
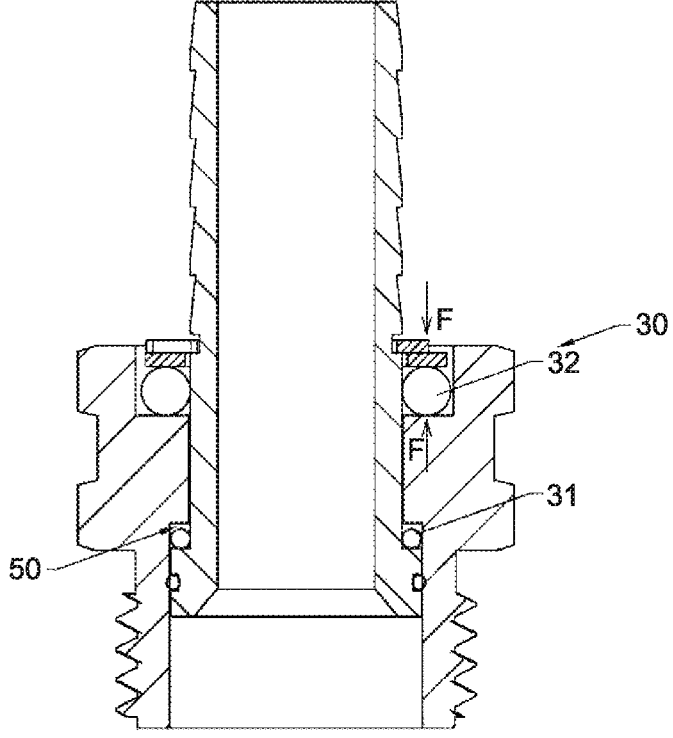

Specifically, as shown in FIG. 1 to FIG. 3, the rotatable water pipe joint comprises an outer adapter 10, an inner adapter 20 and a rolling assembly 30 arranged between the outer adapter 10 and the inner adapter 20, wherein the rolling assembly 30 is sleeved on the outer side of the inner adapter 20 and is located on the inner side of the outer adapter 10; the rolling assembly 30 reduces friction in a rolling manner between the outer adapter 10 and the inner adapter 20, improving the smoothness of mutual rotation between the inner adapter 20 and the outer adapter 20.

The outer adapter 10 is provided with a cylindrical shaft rotating cavity 100, the inner adapter 20 is pivotably arranged in the shaft rotating cavity 100 of the outer adapter 10, and the outer diameter size of the inner adapter 20 is less than or equal to the inner diameter size of the shaft rotating cavity 100 of the outer adapter 10, Thus, when the inner adapter 20 and the outer adapter 10 rotate in opposite directions, the relative rotation between the shaft rotating cavity 100 of the outer adapter 10 and the outer diameter of the inner adapter 20 will not be affected by friction. Preferably, in the preferred embodiment of the present application, a clearance is provided between the inner diameter surfaces of the inner adapter 20 and the outer adapter 10, that is, the inner adapter 20 and the outer adapter 10 are not in direct contact with each other in the circumferential direction, so that the friction force generated when the inner adapter 20 and the outer adapter 10 rotate relative to each other can be avoided. The rolling assembly 30 is disposed between the outer adapter 10 and the inner adapter 20, and supports the inner adapter 20 to rotate in an inner space of the outer adapter 10 in an axial direction. The rolling assembly 30 supports the inner adapter 20 inside the outer adapter 10 in the axial direction, and provides rolling support for the inner adapter 20 and the outer adapter 10 in the axial direction, thereby reducing friction when the inner adapter 20 and the outer adapter 10 rotate relative to each other. In other words, in the preferred embodiment of the present application, there is a gap between the outer circumferential surface of the inner adapter 20 and the inner circumferential surface of the outer adapter 10, and the outer circumferential surface of the inner adapter 20 is not in direct contact with the inner circumferential surface of the outer adapter 10, so that when the inner adapter 20 and the outer adapter 10 rotate in opposite directions, There is no friction between the inner adapter 20 and the outer adapter 10.

The rotatable water pipe joint is provided with a rotation axis O, wherein a direction in which a central axis of the outer adapter 10 and a central axis of the inner adapter 20 are parallel to or overlap with the rotation axis O of the rotatable water pipe joint, that is, the inner adapter 20 and the outer adapter 10 can relatively rotate along the direction of the rotation axis O.

The outer adapter 10 comprises an outer sleeve 11, a sleeve fixing end 12 integrally extending outward from one end of the outer sleeve 11 along the axial direction, and a sleeve extending end 13 integrally extending outward from the other end of the outer sleeve 11 along the axial direction, wherein the outer sleeve 11 of the outer adapter 10 is sleeved on the outer side of the inner adapter 20; the sleeve fixing end 12 of the sleeve extends outward from one end of the outer sleeve 11 for connecting a spray head, a nozzle or other equipment, and the sleeve extending end 13 of the sleeve extends outward from the other end of the outer sleeve and is sleeved on the outer side of the inner adapter 20. The sleeve fixing end 12 of the sleeve is provided with a threaded connection structure, such as an internal thread or an external thread.

The shaft rotating cavity 100 of the outer adapter 10 is formed inside the outer sleeve 11, and a fixed accommodating receiving cavity 120 is formed outside the outer sleeve 11 by the sleeve fixing end 12, wherein the fixed accommodating receiving cavity 120 of the sleeve fixing end 12 communicates with the shaft rotating cavity 100 inside the outer sleeve 11. And the inner diameter of the fixed accommodating receiving cavity 120 is larger than inner diameter of the shaft rotating cavity 100. An extended receiving cavity 130 is formed outside the outer sleeve 11 by the sleeve extending end 13, wherein the extended receiving cavity 130 of the sleeve extending end 13 communicates with the shaft rotating cavity 100 inside the outer sleeve 11, and the inner diameter of the extended receiving cavity 130 is larger than inner diameter of the shaft rotating cavity 100.

The inner adapter 20 is sleeved in the shaft rotating cavity 100 of the outer sleeve 11 of the outer adapter 10, and the inner adapter 20 is supported by the rolling assembly 30 and can freely rotate along the rotation axis O inside the outer adapter 10.

The rolling assembly 30 is disposed outside the end of the outer sleeve 11 of the outer adapter 10, that is, the rolling assembly 30 is disposed in the fixed accommodating receiving cavity 120 of the sleeve fixing end 12 and/or the extended receiving cavity 130 of the sleeve extending end 13. And the fixing assembly 30 provides rotation support for the inner adapter 20 and the outer adapter 10 between the inner adapter 20 and the outer adapter 10, thereby reducing the friction generated when the inner adapter 20 and the outer adapter 10 rotate relative to each other.

The inner adapter 20 comprises an inner shaft barrel 21, a connecting end 22 integrally extending from one end of the inner shaft barrel 21 along the axial direction thereof and a boss 23 integrally extending from the other end of the inner shaft barrel 21 along the axial direction thereof, wherein the inner shaft barrel 21 is sleeved on the inner side of the outer sleeve 11 of the outer adapter 10; In addition, the inner adapter 20 is further provided with a channel 200 communicating with the inner shaft barrel 21, the connecting end 22 and the boss 23. The boss 23 of the inner adapter 20 is located in the fixed accommodating receiving cavity 120 of the sleeve fixing end 12 of the outer adapter 10, and the end opening of the sleeve fixing end 12 is in the same direction as the end opening of the boss 23; the connecting end 22 of the inner adapter 20 protrudes from the sleeve extending end 13 of the outer adapter 10 to the outside of the extended receiving cavity 130, and is adapted to be connected to a water pipe or other equipment. When the water pipe is communicated with the water pipe joint, the water in the water pipe can be transmitted from the connecting end 22 of the inner adapter 20 to the other end through the inner shaft barrel 21 and the boss 23 along the channel 200.

The rotatable water pipe joint further comprises a limiting ring 40, wherein the limiting ring 40 is disposed at one end of the inner shaft barrel 21 of the inner adapter 20, inside the sleeve extending end 13 of the outer adapter 10, for limiting the displacement of the inner adapter 20 in the direction of the rotation axis O, I.e. To prevent the inner adapter 20 from disengaging from the outer adapter 10.

It should be noted that, in the preferred embodiment of the present application, the inner adapter 20 and the outer adapter 10 can freely rotate along the rotation axis O. Because the inner adapter 20 is sleeved in the shaft rotating cavity 100 of the outer adapter 10, The inner adapter 20 and the outer adapter 10 are also movable back and forth in the axial direction of the rotation axis O. For example, when a water pipe connected to the inner adapter 20 is pulled, the boss 23 of the inner adapter 20 is moved toward the outer sleeve 11, so that the boss 23 is pressed against the end of the outer sleeve 11. This results in that the inner adapter 20 and the outer adapter 10 need to relieve the pressure between the inner adapter 20 and the outer adapter 10 in a direction perpendicular to the rotation axis O to improve the freedom of relative rotation between the inner adapter 20 and the outer adapter 10.

In another alternative embodiment of the present application, the rolling assembly 30 includes a first ball set 31, wherein the first ball set 31 is located in the fixed accommodating receiving cavity 120 of the outer adapter 10, which is disposed between the boss 23 of the inner adapter 20 and one end of the outer sleeve 11 of the outer adapter 10 along the direction of the rotation axis O; Which is disposed between an outer diameter surface of the inner shaft barrel 21 of the inner adapter 20 and an inner diameter surface of the outer sleeve 11 of the outer adapter 10 in a direction perpendicular to the rotation axis O. It can be understood that the first ball set 31 can provide support for the inner adapter 20 and the outer adapter 10 along the front-rear direction of the rotation axis O and the inside-outside direction perpendicular to the rotation axis O, avoiding the direct contact between the inner adapter 20 and the outer adapter 10, The friction between the inner adapter 20 and the outer adapter 10 is reduced by rotation.

In another alternative embodiment of the present application, the rolling assembly 30 includes a second ball set 32, wherein the second ball set 32 is located in the extended receiving cavity 130 of the outer adapter 10, which is disposed between the limiting ring 40 and the other end of the outer sleeve 11 of the outer adapter 10 in the direction along the rotation axis O; Which is disposed between an outer diameter surface of the inner shaft barrel 21 of the inner adapter 20 and an inner diameter surface of the outer sleeve 11 of the outer adapter 10 in a direction perpendicular to the rotation axis O. It can be understood that the second ball set 32 can provide rolling support for the limiting ring 40 and the outer adapter 10 in the front-rear direction of the rotation axis O and provide rolling support for the inner adapter 20 and the outer adapter 10 in the inside-outside direction perpendicular to the rotation axis O, Direct contact between the inner adapter 20 and the outer adapter 10 is avoided, and direct contact between the limiting ring 40 and the outer adapter 10 is avoided, reducing friction between the inner adapter 20 and the outer adapter 10 by rotation.

In another alternative embodiment of the present application, the rolling assembly 30 includes a first ball set 31 and a second ball set 32, wherein the first ball set 31 is located in the fixed accommodating receiving cavity 120 of the outer adapter 10, Which is disposed between the boss 23 of the inner adapter 20 and one end portion of the outer sleeve 11 of the outer adapter 10 in a direction of the rotation axis O, between an outer diameter surface of the inner shaft barrel 21 of the inner adapter 20 and an inner diameter surface of the outer sleeve 11 of the outer adapter 10 in a direction perpendicular to the rotation axis O, and between the boss 23 of the inner adapter 20 and one end portion of the outer sleeve 11 of the outer adapter 10. Wherein the second ball set 32 is located in the extended receiving cavity 130 of the outer adapter 10, which is disposed between the limiting ring 40 and the other end of the outer sleeve 11 of the outer adapter 10 in the direction along the rotation axis O; Which is disposed between an outer diameter surface of the inner shaft barrel 21 of the inner adapter 20 and an inner diameter surface of the outer sleeve 11 of the outer adapter 10 in a direction perpendicular to the rotation axis O.

The boss 23 of the inner adapter 20 is located at an end of the inner shaft barrel 21, wherein an outer diameter of the boss 23 is larger than outer diameter of the inner shaft barrel 21, and the boss 23 of the inner adapter 20 is pivotally disposed at the sleeve fixing end 12 of the outer adapter 10. The limiting ring 40 is disposed in the inner shaft barrel 21, the outer diameter dimension of the limiting ring 40 is greater than outer diameter dimension of the inner shaft barrel 21, and the limiting ring 40 is pivotally disposed in the sleeve extending end 13 of the outer adapter 10.

The length of the inner shaft barrel 21 of the inner adapter 20 in the axial direction is greater than length of the outer sleeve 11 of the outer adapter 10 in the axial direction, and the end of the inner shaft barrel 21 protrudes from the end of the outer sleeve 11.

In detail, the inner shaft barrel 21 comprises a shaft sleeve body 211, and a first protruding end 212 and a second protruding end 213 integrally extending outward from the shaft sleeve body 211, wherein the first protruding end 212 protrudes from the shaft sleeve body 211 into the fixed accommodating receiving cavity 120 of the sleeve fixing end 12; The second protruding end 213 protrudes from the shaft sleeve body 211 to the extended receiving cavity 130 of the extension fixing end 13.

It can be understood that the outer diameter of the inner shaft barrel 21 is smaller than inner diameter of the sleeve fixing end 12, the outer diameter of the inner shaft barrel 21 is smaller than inner diameter of the sleeve extending end 13, a first ball receiving chamber 101 for receiving the first ball set 31 is defined by the first protruding end 212 of the inner shaft barrel 21, the boss 23, an end of the outer sleeve 11, and the sleeve fixing end 12. A second ball receiving chamber 202 for receiving the second ball set 32 is defined by the second protruding end 213 of the inner shaft barrel 21, the limiting ring 40, the other end of the outer sleeve 11, and the sleeve extending end 13.

The first ball set 31 includes at least three ball units, wherein the ball units may be, but are not limited to, spherical balls or cylindrical balls. The second ball set 32 includes at least three ball units, wherein the ball units may be, but are not limited to, spherical balls.

Preferably, in a specific example of the present application, the first ball set 31 includes a plurality of ball units, and the second ball set 32 includes a plurality of ball units, wherein the size of the ball units of the first ball set 31 and the second ball set 32 can be adjusted according to the size of the accommodating chamber. Each of the ball units of the first ball set 31 and the second ball set 32 is uniformly arranged in the first ball accommodation chamber 101 and the second ball accommodation chamber 202.

The rotatable water fitting is further provided with at least one adjustable gap 50 in the direction of the axis of rotation O, wherein the adjustable gap 50 is formed between the boss 23 of the inner adapter 20 and the outer sleeve 11 of the outer adapter 10 and/or between the limiting ring 40 and the outer sleeve 11 of the outer adapter 10.

When the inner adapter 20 is pushed toward the sleeve fixing end 12 of the outer adapter 10, the adjustable gap 50 is formed between the boss 23 of the inner adapter 20 and the outer sleeve 11 of the outer adapter 10, the length of the first ball receiving chamber 101 is increased, The first ball set 31 disposed between the boss 23 and the outer sleeve 11 only needs to be supported between the sleeve fixing end 12 of the outer adapter 10 and the inner shaft barrel 21 of the inner adapter 20; While the second ball set 32 is pressed between the limiting ring 40 and the outer sleeve 11 to provide a rolling support function in the forward and backward directions along the rotation axis O. When the inner adapter 20 is pulled toward the sleeve extending end 13 of the outer adapter 10, the adjustable gap 50 is formed between the limiting ring 40 and the outer sleeve 11 of the outer adapter 10, the length of the second ball receiving chamber 202 increases, The second ball set 32 disposed between the limiting ring 40 and the outer sleeve 11 need only be supported between the sleeve extending end 13 of the outer adapter 10 and the inner shaft barrel 21 of the inner adapter 20; While the first ball set 31 is pressed between the boss 23 of the inner adapter 20 and the outer sleeve 11 to provide a rolling support function in the front-rear direction along the rotation axis O.

It can be understood that, in the preferred embodiment of the present application, the first ball set 31 and the second ball set 32 of the rolling assembly 30 are disposed at opposite sides of the outer sleeve 11, and the positions of the first ball set 31 and the second ball set 32 in the ball accommodating chamber can be adjusted due to the adjustable gap 50. Therefore, when the ball units of the first ball set 31 provide rolling support for the inner and outer adapters 20 and 10 in the axial direction, the ball units of the second ball set 32 are in a free state; The ball units of the first ball set 31 are in a free state when the ball units of the second ball set 32 provide rolling support for the inner and outer adapters 20 and 10 in the axial direction. In this way, the pressure borne by the rolling assembly 30 is greatly reduced, and the service life is prolonged.

In addition, it can be understood that the adjustable gap 50 is formed in the first ball receiving chamber 101 and/or in the second ball receiving chamber 202, which greatly reduces the accuracy and difficulty of the manufacturing process.

It is worth mentioning that the length of the inner shaft barrel 21 of the inner adapter 20 is greater than sum of the lengths of the outer sleeve 11, the first ball set 31, and the second ball set 32 of the outer adapter 10, so that the adjustable gap 50 whose position and size can be adjusted is formed on both sides of the outer sleeve 11 of the outer adapter 10.

The limiting ring 40 is fixed at the end of the second protruding end 213 of the inner shaft barrel 21, and the limiting ring 40 can rotate synchronously with the inner shaft barrel 21. Preferably, in a specific example of the present application, the limiting ring 40 is fixed on the second protruding end 213 of the inner shaft barrel 21 by a snap-fit method. The inner shaft barrel 21 is further provided with a slot 210, and the limiting ring 40 is disposed in the slot 210 of the inner shaft barrel 21. The limiting ring 40 may be, but is not limited to, a snap ring.

The rotatable water pipe joint further comprises a gasket 60, wherein the gasket 60 is sleeved between the sleeve extending end 13 of the outer adapter 10 and the inner shaft barrel 21, and is located outside the second ball set 32 for protecting and limiting each ball unit of the second ball set 32. Preferably, in one specific example of the present application, the gasket 60 may be, but is not limited to, a metal gasket.

The rotatable water pipe joint further includes a sealing member 70, wherein the sealing member 70 is disposed between the inner adapter 20 and the outer adapter 10 for preventing water from leaking from the fixed accommodating receiving cavity 120 of the outer adapter 10 in the direction of the shaft rotating cavity 100. The sealing member 70 is disposed between the boss 23 of the inner adapter 20 and the sleeve fixing end 12 of the outer adapter 10.

As an example, in a specific example of the present application, the sealing member 70 is implemented as an elastic sealing ring or a sealing ring, which is sleeved between the boss 23 of the inner adapter 20 and the sleeve fixing end 12 of the outer adapter 10.

The boss 23 is further provided with a sealing groove 230, and the sealing member 70 is disposed in the sealing groove 230 of the boss 23.

Figure 6A:
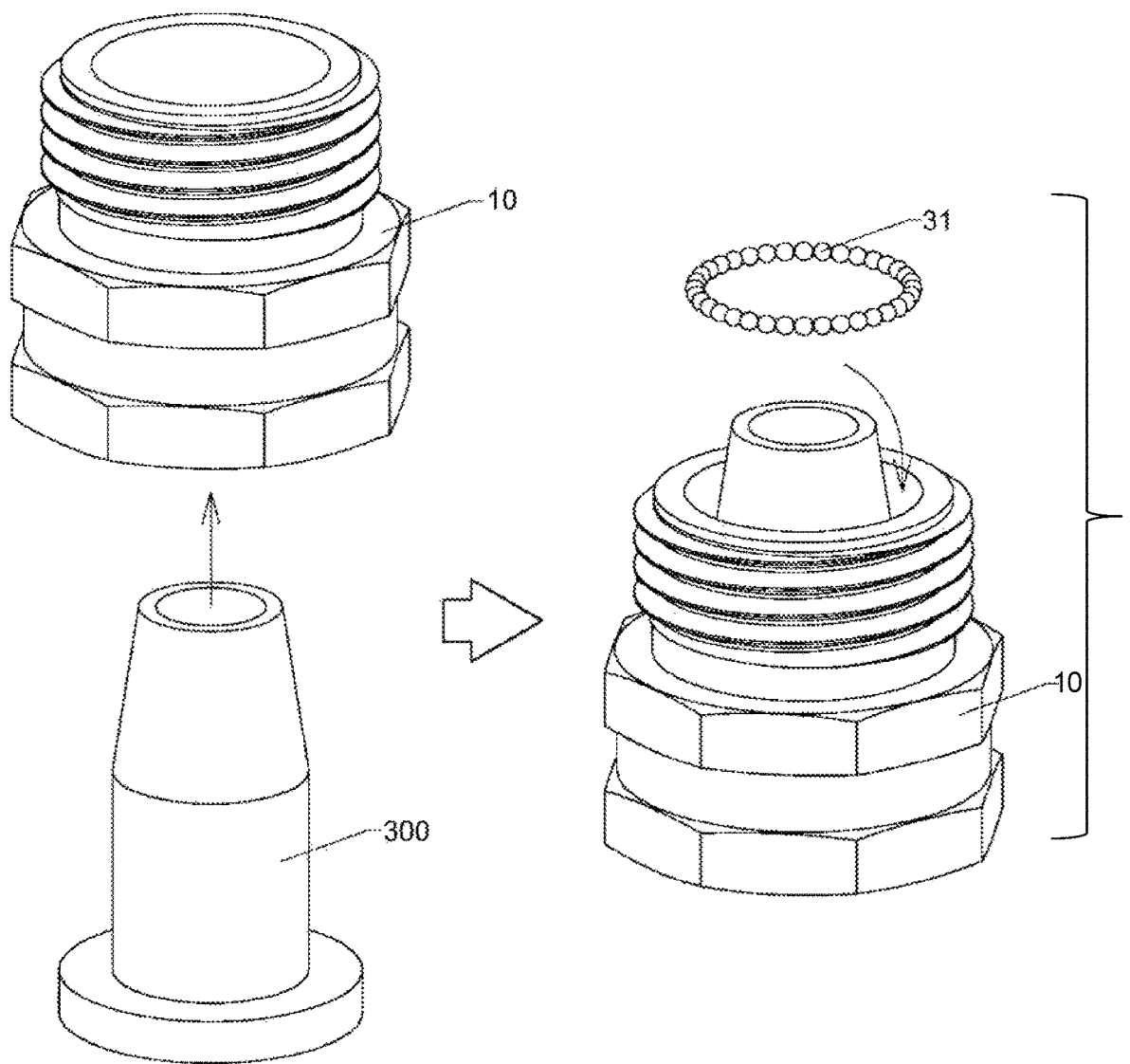
FIGS. 6A to 6C are schematic diagrams illustrating steps of the assembling method according to the above embodiment of the present application.
Figure 6B:
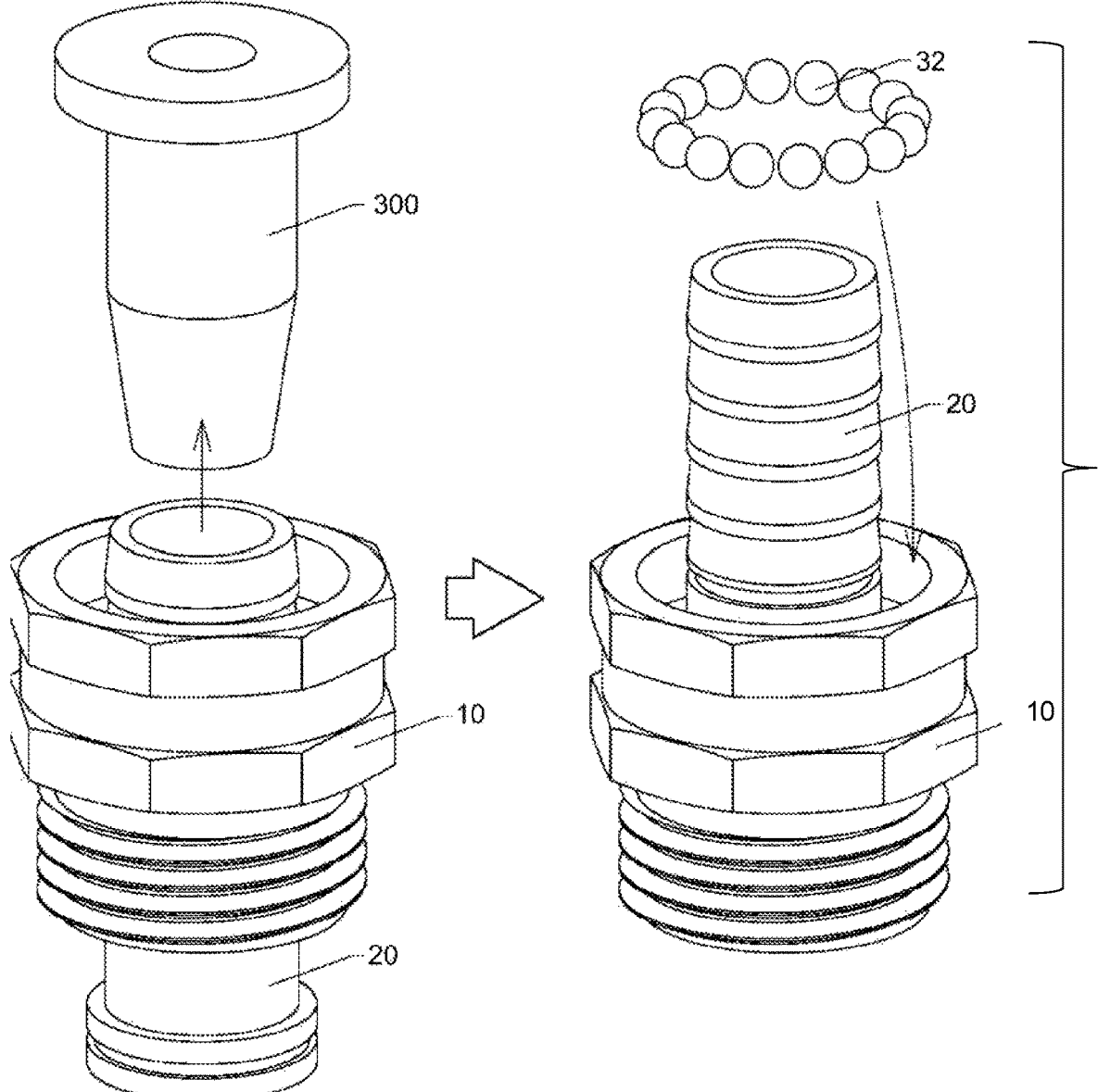
Figure 6C:
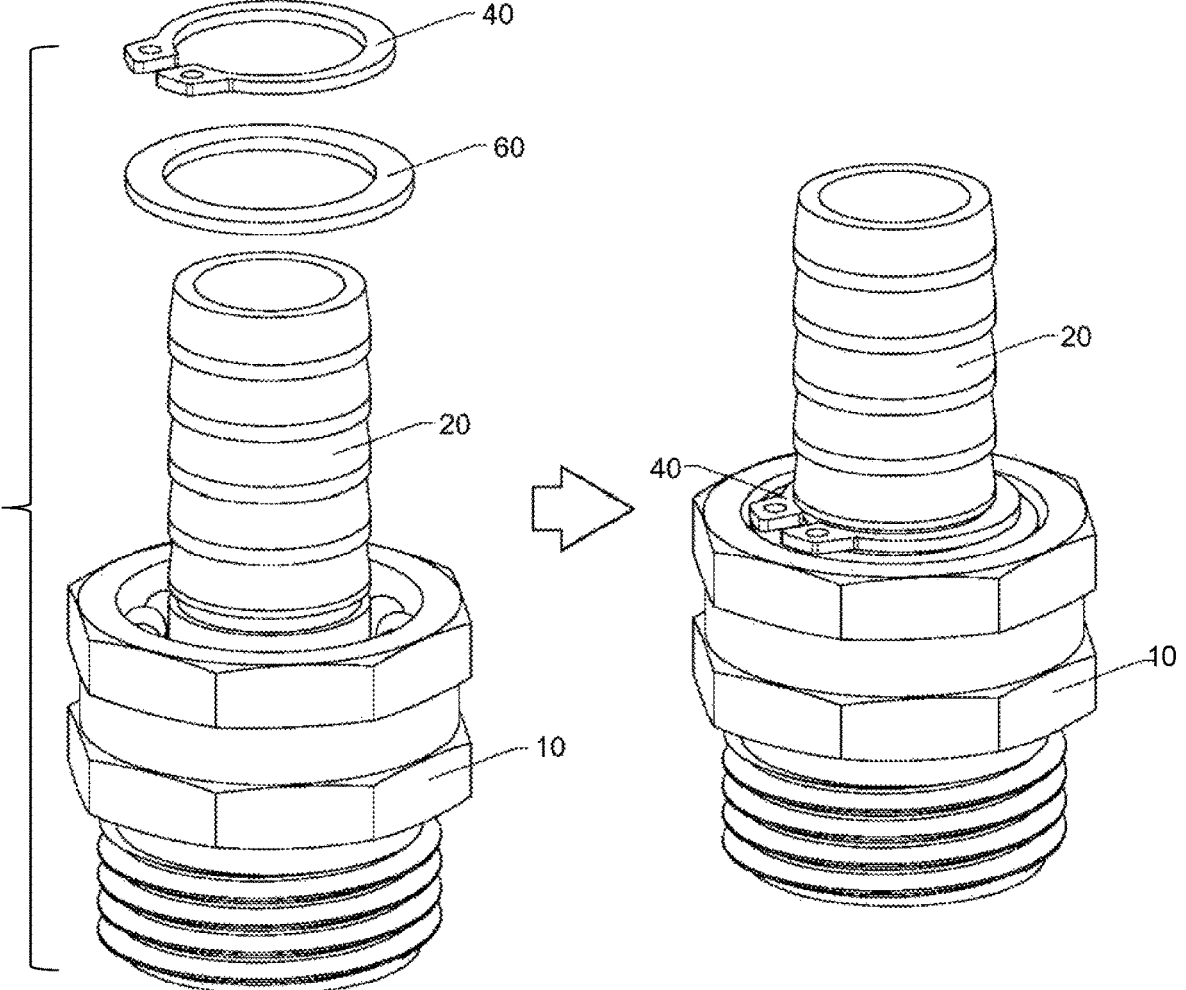

As shown in FIGS. 5 to 6C, according to another aspect of the present application, there is further provided a method of assembling a rotatable water pipe joint, wherein the method of assembling comprises the steps of:

(A) Inserting an assembly assisting rod 300 into the shaft rotating cavity 100 of the outer adapter 10, and loading at least three ball units of the first ball set 31 into the sleeve fixing end 12 of the outer adapter 10 along the periphery of the assembly assisting rod 300;

(B) Ejecting an end of the assembly assisting rod 300 out of the shaft rotating cavity 100 of the outer adapter 10 using the inner adapter 20, so as to install the first ball set 31 in the first ball accommodating chamber 101 between the inner adapter 20 and the outer adapter 10, and (C) Loading at least three ball units of a second ball set from said sleeve extending end 13 of said outer adapter 10 to said sleeve extending end 13 along the periphery of said inner adapter 10 to load said second ball set 32 between said inner adapter 20 and said outer adapter 10.

In the assembling method of the preferred embodiment of the present application, it is necessary to fit the plurality of ball units of the first ball set 31 and the ball units of the second ball set 32 between the inner adapter 20 and the outer adapter 10 from two opposite directions. The assembling method of the preferred embodiment of the present application is to mount the ball unit of the first ball set 31 to the first ball receiving chamber 101 by means of the assembly assisting rod 300. It is worth mentioning that in the preferred embodiment of the present application, the assembly assisting rod 300 is a rod-shaped structure or a hollow cylinder-shaped structure adapted to the inner diameter of the shaft rotating cavity 100 of the outer adapter 10.

As an example, the assembly assisting rod 300 is implemented as an inner adapter 20 that is inserted from the extended receiving cavity 130 into the fixed accommodating receiving cavity 120 in an inverted manner to facilitate the installation of the ball unit into the sleeve fixing end 12 from the outside of the inner adapter 20.

In the step (B) of the above preferred embodiment of the present application, the inner adapter 20 is inserted from the sleeve fixing end 12 of the outer adapter 10 through the outer sleeve 11 to the sleeve extending end 13 until the boss 23 of the inner adapter 20 is inserted into the sleeve fixing end 12.

Between the steps (B) and (C) of the above preferred embodiment of the present application is the step of inverting the inner adapter 20 and the outer adapter 10 so that the opening of the sleeve extending end 13 of the outer adapter 10 faces upward.

The assembly method further includes the step of mounting the gasket 60 and the limiting ring 40 above the second ball set 32.

It will be understood by those skilled in the art that the embodiments of the invention described above and illustrated in the drawings are by way of example only and are not limiting of the invention. The objects of the present invention have been fully and effectively achieved. The functional and structural principles of the present invention have been shown and described in the embodiments, and the embodiments of the present invention may be subject to any variations or modifications without departing from the principles.

The technical scope of the present invention is not limited to the contents of the above description, and those skilled in the art may make various changes and modifications to the above embodiments without departing from the technical idea of the present invention, and such changes and modifications fall within the scope of the present invention.

What is claimed is:

1. A rotatable water pipe joint, comprising:

An outer adapter having a cylindrical shaft rotating cavity;

An inner adapter pivotably disposed within the shaft rotating cavity of the outer adapter; and A rolling assembly arranged between the outer adapter and the inner adapter, the rolling assembly being sleeved on the outer side of the inner adapter and being positioned on the inner side of the outer adapter, and reducing friction between the outer adapter and the inner adapter in a rolling manner;

wherein the outer adapter comprises an outer sleeve, a sleeve fixing end, and a sleeve extending end, wherein the sleeve fixing end integrally extends outward along an axial direction from one end of the outer sleeve, and the sleeve extending end integrally extends outward along the axial direction from the other end of the outer sleeve, wherein a fixed accommodating cavity is formed at an outer side of the outer sleeve by the sleeve fixing end, and an extended accommodating cavity is formed at the outer side of the outer sleeve by the sleeve extending end;

wherein the inner adapter comprises an inner shaft barrel, a connecting end, and a boss, wherein the connecting end integrally extends outward from one end of the inner shaft barrel along an axial direction of the inner shaft barrel, and the boss integrally extends outward from the other end of the inner shaft barrel along the axial direction of the inner shaft barrel, wherein the inner shaft barrel is sleeved on an inner side of the outer sleeve, wherein the boss is located in the fixed accommodating cavity, and wherein the connecting end protrudes from the sleeve extending end of the outer adapter to an exterior of the extended accommodating cavity;

further comprising a limiting ring disposed at an end of the inner shaft barrel inside the sleeve extending end of the outer adapter for limiting displacement of the inner adapter along a rotation axis; and wherein the rolling assembly comprises:

(a) a first ball set located in the fixed accommodating cavity, the first ball set being disposed (i) axially between the boss and said one end of the outer sleeve, and (ii) radially between an outer diameter surface of the inner shaft barrel and an inner diameter surface of the outer sleeve; and (b) a second ball set located in the extended accommodating cavity, the second ball set being disposed (i) axially between the limiting ring and the other end of the outer sleeve, and (ii) radially between the outer diameter surface of the inner shaft barrel and the inner diameter surface of the outer sleeve.

2. The rotatable water pipe joint according to claim 1, wherein the inner shaft barrel comprises a shaft tube main body, and a first protruding end and a second protruding end that integrally extend outward from the shaft tube main body, wherein the first protruding end protrudes from the shaft tube main body to the fixed accommodating cavity of the sleeve fixing end, and the second protruding end protrudes from the shaft tube main body to the extended accommodating cavity of the sleeve extending end.

3. The rotatable water pipe joint according to claim 2, wherein the outer diameter of the inner shaft barrel is smaller than the inner diameter of the sleeve fixing end, the outer diameter of the inner shaft barrel is smaller than the inner diameter of the sleeve extending end, and a first ball accommodating chamber for accommodating the first ball set is formed at the first protruding end of the inner shaft barrel, the boss, said one end of the outer sleeve, and the sleeve fixing end; a second ball accommodating chamber for accommodating the second ball set is formed at the second protruding end of the inner shaft barrel, the limiting ring, said other end of the outer sleeve, and the sleeve extending end.

4. The rotatable water pipe joint of claim 3, wherein the first ball set comprises a plurality of ball units, and the second ball set comprises a plurality of ball units, wherein the size of the ball units of the first ball set and the second ball set can be adjusted according to the size of the first ball accommodating chamber and the second ball accommodating chamber.

5. The rotatable water pipe joint according to claim 4, further comprising a gasket, wherein the gasket is sleeved between the sleeve extending end of the outer adapter and the inner shaft barrel, and is located outside the second ball set.

6. The rotatable water pipe joint of claim 3, further having at least one adjustable gap, wherein the adjustable gap is formed in at least one of: (i) between the boss of the inner adapter and the outer sleeve of the outer adapter and (ii) between the limiting ring and the outer sleeve of the outer adapter.

7. The rotatable water pipe joint of claim 6, further comprising a sealing member, wherein the sealing member is disposed between the inner adapter and the outer adapter.

8. A method of assembling a rotatable water pipe joint, wherein the method comprises the steps of:

(A) Inserting an assembly auxiliary rod into a shaft rotating cavity of the outer adapter, and loading at least three ball units of a first ball set into the sleeve fixing end from the sleeve fixing end of the outer adapter along the periphery of the assembly auxiliary rod;

(B) Ejecting an end of the assembly auxiliary rod out of the shaft rotating cavity of the outer adapter using an inner adapter to receive the first ball set between the inner adapter and the outer adapter; and (C) Loading at least three ball units of a second ball set from the sleeve extending end of the outer adapter to the sleeve extending end along the periphery of the inner adapter to load the second ball set between the inner adapter and the outer adapter.

9. The assembly method according to claim 8, wherein, in step (A), the assembly auxiliary rod comprises an auxiliary inner adapter, and the auxiliary inner adapter is inserted in an inverted manner from the extended accommodating cavity into the fixed accommodating cavity to facilitate loading the ball units of the first ball set into the sleeve fixing end.

10. The assembly method according to claim 9, further comprising, between steps (B) and (C), flipping the inner adapter and the outer adapter so that an opening of the sleeve extending end of the outer adapter faces upward.

11. The assembly method according to claim 10, further comprising installing a gasket and a limiting ring above the second ball set.

12. The assembly method according to claim 8, wherein, in step (B), the inner adapter is inserted from the sleeve fixing end of the outer adapter through the outer sleeve toward the sleeve extending end until the boss of the inner adapter is inserted into the sleeve fixing end.

* * * * *